United States Patent [19]
Huffaker et al.

[11] 3,846,351
[45] Nov. 5, 1974

[54] SECONDARY AROMATIC ALKYL DIAMINES AS FOAM CATALYSTS AND CHAIN EXTENDERS

[75] Inventors: James E. Huffaker; Ambrose J. Clonce; John E. Besser, all of Kingsport, Tenn.

[73] Assignee: Eastman Kodak Company, Rochester, N.Y.

[22] Filed: Aug. 21, 1973

[21] Appl. No.: 390,292

Related U.S. Application Data

[63] Continuation of Ser. No. 275,123, July 26, 1972, abandoned.

[52] U.S. Cl....260/2.5 AM, 260/2.5 AC, 260/2.5 AE, 260/77.5 AC, 260/77.5 HM, 260/577
[51] Int. Cl..................... C08g 22/46, C08g 22/36
[58] Field of Search... 260/2.5 AM, 2.5 AC, 75 NH, 260/77.5 AM, 75 NC, 77.5 AC, 577

[56] References Cited
UNITED STATES PATENTS

| | | | |
|---|---|---|---|
| 2,692,288 | 10/1954 | Bell et al............................ | 260/577 |
| 2,779,789 | 1/1957 | Rosenwald et al.................. | 260/577 |
| 3,194,793 | 7/1965 | Kogon......................... | 260/77.5 AM |
| 3,437,608 | 4/1969 | Pohl.............................. | 260/2.5 AC |

*Primary Examiner*—H. S. Cockeram
*Attorney, Agent, or Firm*—Cecil D. Quillen, Jr.; John F. Stevens

[57] ABSTRACT

A method of preparing flexible polyurethane foam by reacting a polyether polyol with a diisocyanate, using from about 0.01 to about 50 parts by weight per hundred parts polyol of N,N'-dialkyl-p-phenylenediamine, N,N'-dialkyl-m-phenylenediamine or mixtures thereof wherein the alkyl substituents contain from 3 to 10 carbon atoms as combination catalysts and chain extending agents, and a blowing agent.

1 Claim, No Drawings

SECONDARY AROMATIC ALKYL DIAMINES AS FOAM CATALYSTS AND CHAIN EXTENDERS

This is a continuation, of application Ser. No. 275,123 filed July 26, 1972, now abandoned.

This invention relates to a method of preparing flexible polyurethane foams by the use of compounds which function as both catalysts and chain extending agents.

In the preparation of flexible polyurethane foams, it is known in the art to react an isocyanate-containing material, such as a diisocyanate, with a hydroxyl-containing material, such as a polyether or polyester polyol to form polyurethane or urethane polymer. The polyurethane may be made by conventional processes such as the well known one-shot process and the prepolymer process. In the one-shot process, the isocyanate is not reacted with polyol prior to mixing of the components. In the prepolymer process, an intermediate is prepared by prereacting all of the isocyanate material with part or all of the polyol.

The present invention provides a method which is especially applicable to the one-shot process. It has been discovered that this method is particularly effective in catalyzing the reaction between the polyol and the diisocyanate and in crosslinking the polymer to provide good physical properties such as tensile strength, tear resistance, and compression set. According to the present invention, N,N'-dialkyl-p-phenylenediamine, and N,N'-dialkyl-m-phenylenediamine, wherein the alkyl substituents contain from 3 to 10 carbon atoms, are used as combination catalysts and chain extenders in the production of polyurethane foam. Included within the intended scope of these phenylenediamines are the methyl derivatives thereof, or the toluenediamines.

Polyurethane foams have been found to be useful in a number of applications such as, for example, cushioning for furniture and automobiles, carpet pads, insulation material, etc.

It is accordingly an object of this invention to provide a method which is especially useful in promoting good physical properties of flexible polyurethane foam as well as catalyzing the reaction between the polyol and isocyanate.

It is still another object of this invention to provide a polyurethane formulation which, when used in the manner described herein, results in a flexible foam having improved physical properties.

Other objects and advantages of the invention will be apparent from the following description, examples and appended claims.

According to this invention, N,N'-dialkyl-p-phenylenediamine, N,N-dialkyl-m-phenylenediamine, or mixtures thereof wherein the alkyl substituents contain from 3 to 10 carbon atoms are used in polyurethane preparations in concentration levels of from about 0.01 to about 50.0 parts by weight per hundred parts polyol, preferably at concentration levels of between about 0.5 to about 5 parts by weight per hundred parts polyol. The selected compound may preferably be blended with the polyol component prior to mixing with the diisocyanate.

A preferred N,N'-dialkyl-p-phenylenediamine, i.e., N,N'-bis-(1,4-dimethylpentyl)-p-phenylenediamine is available commercially from Eastman Chemical Products, Inc. under the trademark "Tenamene-4." N,N'-dialkyl-m-phenylenediamines and N,N'-dialkyl-m-toluenediamines may be produced according to the following reaction:

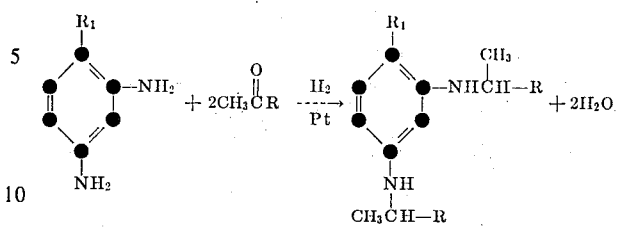

wherein R is alkyl having 3 to 10 carbon atoms, and $R_1$ is H or methyl.

In a typical preparation, of N,N'-dialkyl-m-toluenediamine, a mixture of 336 g. (3 moles) of toluene-2,4-diamine, 10.5 moles of methylalkyl ketone, 5 ml. of 70 percent glycolic acid, and 14 g. of 1 percent platinum on carbon hydrogenation catalyst, is hydrogenated in a one gallon stainless steel rocking autoclave for 15 hr. at 165°C. and 1,500 psi of hydrogen. The mixture is cooled, filtered and the organic layer is separated and distilled at reduced pressure to give the N,N'-dialkyl-22,4-toluenediamine in 80–92 percent yield. Mixtures of toluene-2,4-diamine and toluene-2,6-diamine may be used as the starting material if desired to give the corresponding N,N'-dialkyl toluenediamines. In a similar manner, the dinitrotoluenes may be used as starting materials, but a slightly lower yield is obtained.

The polyether polyols used in preparing the polyurethane may be obtained from alkylene oxides, glycols, heterocyclic ethers and other materials by polymerization, copolymerization and the like. For example, tetrahydrofuran may be polymerized in the presence of catalytic amounts of fluorosulfonic acid to make polytetramethylene ether glycol having the formula $$HO(-CH_2-CH_2-CH_2-CH_2-O-)_nH$$

where n is an integer. Glycols may also be polymerized in the presence of mineral acids, sulfonic acid or Fuller's earth. Other methods well known to those skilled in the art may be utilized in the preparation of these polyether polyols. The linear polyether polyols have at least three, and as many as eight or more, carbon atoms in their alkylene groups. Examples of polyether glycols are polypropylene ether glycol, polyethylenepropylene ether glycol, polytetramethylene ether glycol, polypentamethylene ether glycol, polyhexamethylene ether glycol, poly-1,6-octamethylene ether glycol and the like and mixtures thereof.

Branch chain polyether polyols may be obtained by reacting glycols or alkylene oxides or mixtures thereof and the like with materials such as sucrose, sorbitol, styrene-vinylalcohol copolymers, hexanetriol, pentaerythritol, glycerol, phloroglucinol, trimethylolphenol, trimethylolbenzene, trimethylolpropane and the like. It is preferred to employ the high molecular weight branch chain polyols.

The average molecular weight of the polyether-polyols may vary from about 175 to 5000 or more. It is preferred to employ branch chain polyethers having an average molecular weight of from about 2000 to 4000 and at least 3 reactive hydroxyl groups.

While unsaturated polyethers and polyols may be employed, it is desirable to use materials which are saturated or essentially saturated. The polyethers, also, should be substantially or essentially hydroxyl terminated. It is also preferred that the hydroxyl groups be primary or secondary and it is even more preferred that the hydroxyl groups of the polyethers and crosslinkers be primary hydroxyl groups to improve heat stability.

Polyesters or polyester polyols may be used in small amounts with the polyethers so long as the resulting polyurethane contains a major amount of ether linkages relative to ester linkages. The polyesters should be substantially linear and hydroxyl terminated, should have an average molecular weight of from about 600 to 3000 or more and should have an acid number less than 10 and preferably less than 3. The polyester is usually prepared by the esterification of at least one aliphatic dibasic acid or an anhydride thereof with at least one glycol. Ratios of more than one mole of glycol to acid are used so as to obtain chains containing a mostly terminal hydroxyl group. The acids used in making the linear polyesters are generally aliphatic dicarboxylic acids having the formula

HOOC—R—COOH where R is an alkylene radical having from 2 to 8 carbon atoms. Preferably, these acids have the formula $HOOC(CH_2)_xCOOH$ where $x$ is a number from 3 to 8. anhydrides of the acids, and mixtures of acids and their anhydrides may be used. Examples of dicarboxylic acids include adipic, succinic, pimelic, suberic, azelaic, and sebacic acids. The glycols used in making the linear esters usually contain from 4 to 10 carbon atoms. Preferably, in making linear polyesters, the glycols have the formula $HO(CH_2)_yOH$ where $y$ is a number from 4 to 8. Mixtures of the glycols can be used if desired. Examples of useful glycols include 1,4-butanediol, 1,6-hexanediol, 1,8-octanediol and the like. The polyesters can also be made by transesterification and other processes.

Where branch chain polyesters are desired, they may be obtained by the reaction of glycerol, hexanetriol, pentaerythritol or other polyols with dicarboxylic and other polycarboxylic acids.

It is preferred that the polyester when used contain a substantial number of carbon linkages of at least three carbon atoms between ester linkages, be saturated, and contain primary or secondary hydroxyl termination, more preferably primary hydroxyl termination. Instead of using mixtures of polyesters and polyethers, these materials or mixtures of dicarboxylic acids and polyether glycols and the like may be reacted together to form a composite polyether-ester polyol containing a major amount of ether relative to ester linkages. Mixtures of the various polyols disclosed herein such as polyethers, polyether-esters, polyethers-polyesters, and polyol crosslinking agents can be used in the practice of the present invention.

The polyisocyanate may be any polyisocyanate having 2, 3 or more functional or reactive isocyanate groups. They may be aromatic, aliphatic or aliphatic-aromatic compounds. Examples of useful polyisocyanates which may be employed are tolylene diisocyanate, p,p'-methylenedi(phenylisocyanate), methylenedi(tolylisocyanate), bitolyene diisocyanate, xylylene diisocyanate, durene diisocyanate (2,3,5,6-tetramethylparaphenylene-diisocyanate), p,p'-isopropylidenedi(phenylisocyanate), diphenyl dimethyl methane diisocyanate, hexamethylene diisocyanate, naphthalene-1,5-diisocyanate, naphthalene triisocyanate, dichlorodiphenyl methane diisocyanate, metaphenylene diisocyanate, paraphenylene diisocyanate, diphenylether diisocyanate, and polyaryl polyisocyanates having the general formula

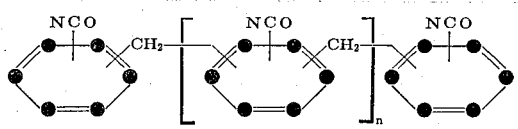

where n has an average value of 1. Still other polyisocyanates can be employed. Mixtures of the polyisocyanates can be used, for example, an 80:20 or 65:35 mixture of 2,4- and 2,6-tolylene diisocyanates or other polyisocyanate mixtures can be used. A preferred class of diisocyanates including the tolylene diisocyanates has the general formula:

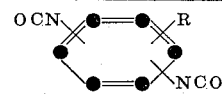

where R is selected from the group consisting of hydrogen, methyl, ethyl, propyl, isopropyl, butyl, amyl, hexyl, and the other lower alkyl groups.

It is preferred in the practice of this invention that from about 0.5 to 10 equivalents of isocyanate per equivalent of polyether polyol or polyether-polyester polyol be used. The polyurethane may contain residual hydroxyl or isocyanate groups or the reactants can be balanced such that the product contains little, if any, unreacted isocyanate and/or hydroxyl groups.

Other materials may be added to the reaction mixture such as silicones and silicone oils. Silicones or silanes such as vinyl triethoxy silane, butyl triethoxy silane, amyl triethoxy silane and other organic silanes and silicones and the like are useful in the practice of the present invention. Only small amounts of silicones should be used with the polyether-polyester type foams while much larger amounts can be used with the polyether type. Emulsifiers may also be used, and are preferably anionic or nonionic and also preferably are nonacidic or substantially nonacidic. Wetting agents, carbon black, pigments, metal flakes, synthetic and natural fibers (wool, cellulose, nylon, glass, etc., surface treated or not), dyes, antioxidants, antiozonants or antidegradants, deodorants, fungicides, plasticizers, rubber, resins, fire retardants and the like also may be used in the reaction mixture. If a foam is to be made using water, the water can be added in the form of a natural or synthetic rubber and/or resin latex.

In making flexible polyurethane foams, a small amount of water or other blowing agent is added to the reaction mixture. When water is used, it is generally used in an amount of between about 0.5 and 5.0 percent by weight, based on the weight of the polyol. The water can be mixed directly with the reactants. In cases where a prepolymer is made, it is desirable that the reactants be substantially anhydrous to avoid the formation of urea groups so that in this case the water should be added at about the time of foaming.

Lithium aluminum hydride can be used with water as a blowing agent. In place of water or water-activated materials, other blowing agents can be used such as the liquid fluoro- or chlorofluoroalkanes, liquified hydrocarbon gases, such as methane, ethane or the like. Mixtures of water with these materials may also be used. The liquid organic blowing or foaming materials may be used in an amount of from about 2 to 40 percent, preferably from 9 to 30 percent, by weight based on the total weight of the polyurethane foaming materials.

Metallic salts such as stannous octoate, dibutyl tin dilaurate, stannous oleate, etc., may also be used as polymerization catalysts.

The examples below are submitted for a better understanding of the invention. In the examples, polyurethane formulations are prepared by blending the ingredients indicated and extruding the blend into a pan. In blending the ingredients, diisocyanate from one container, and the remainder of the ingredients from another container are mixed in a high shear blender and extruded through a nozzle into a pan. The mixture is allowed to rise during which time an exothermic reaction occurs. After allowing the samples to cure for 72 hours, the physical properties indicated are measured. As used herein, "cream" time is the time from mixing until the reaction starts. "Rise" time is measured from mixing until the end of the blowing reaction.

The following basic formulation is used in the examples:

In the examples, tear resistance is measured in pounds per linear inch according to ASTM D-1564-6-2-G. Elongation is measured in percent of original length according to ASTM D-1564-62-T. Tensile strength is measured in pounds per square inch according to ASTM D-1564-62-T.

Unless otherwise specified, all percentages, parts, etc., are by weight.

Although the invention has been described in considerable detail with particular reference to certain preferred embodiments thereof, variations and modifications can be effected within the spirit and scope of the invention.

We claim:

1. In the method of producing flexible polyurethane foam by reacting a polyether polyol with a diisocyanate and foaming said polyurethane by the use of a blowing agent, the improvement which comprises incorporating with said reactants as the only catalyst and chain extending agent between about 0.5 and about 5 parts by weight per hundred parts polyol of a compound selected from the group consisting of N,N'-dialkyl-p-phenylenediamine and N,N'-dialkyl-m-phenylenediamine wherein said alkyl groups contain between 3 and 10 carbon atoms.

* * * * *

| Basic Formulation A | Parts, by weight |
| --- | --- |
| Polyether polyol, m.w. 3050 | 100.0 |
| Toluene diisocyanate, 80/20 mixture of 2,4- and 2,6-isomer | 40.0 |
| Distilled water | 3.0 |
| Silicone oil | 1.0 |
| Stannous octoate | 1.0 |

| Ex. | Diamine | Concentration, Parts Per Hundred Parts Polyol, By Weight | Cream Time, Sec. | Rise Time, Sec. | Tensile Strength, psi | D-1564 Elongation, % | Tear Resistance, Lb. | Density Lb./Cu. Ft. |
| --- | --- | --- | --- | --- | --- | --- | --- | --- |
| 1 | N,N'-disecbutyl-p-phenylenediamine | 0.3 | 23 | 215 | 11.0 | 126 | 1.9 | 2.25 |
| 2 | N,N'-diisopropyl-p-phenylenediamine | 0.3 | 21 | 220 | 8.4 | 95 | 1.5 | 2.07 |
| 3 | N,N'-bis(1,4-dimethyl-pentyl)4-methyl-m-phenylenediamine | 0.5 | 14 | 146 | 22.4 | 156 | 3.1 | 1.67 |
| 4 | N,N'-bis(1,4-dimethyl-pentyl)-p-phenylenediamine | 0.5 | 13 | 155 | 25.6 | 190 | 2.7 | 1.80 |
| 5 | N,N'-disecbutyl-p-phenylenediamine | 0.5 | 14 | 151 | 21.9 | 135 | 2.9 | 1.67 |
| 6 | N,N'-disecbutyl-p-phenylenediamine | 2.0 | 20 | 230 | 12.7 | 210 | 2.9 | 2.84 |
| 7 | N,N'-di-(1-methyl-octyl)-p-phenylenediamine | 0.3 | 22 | 220 | 6.0 | 55 | 0.9 | 2.35 |